United States Patent
Satake et al.

[11] 3,988,275
[45] Oct. 26, 1976

[54] CONCENTRATED LATEX OF SYNTHETIC RUBBERS AND THE METHOD FOR THE PREPARATION THEREOF

[75] Inventors: Kunio Satake; Takeshi Wada, both of Yokohama; Kuniaki Sakamoto, Kawasaki; Hiroshi Harada, Yokohama; Yasushi Sato, Kawasaki, all of Japan

[73] Assignee: Asahi Kasei Kogyo Kabushiki Kaisha, Osaka, Japan

[22] Filed: Sept. 5, 1974

[21] Appl. No.: 503,433

[30] Foreign Application Priority Data
Sept. 5, 1973 Japan.............................. 48-9̵-153
Sept. 5, 1973 Japan.............................. 48-99154
July 26, 1974 Japan.............................. 49-85090

[52] U.S. Cl. ............................ 260/23 R; 260/27 B; 260/876 B; 260/29.7 NR; 260/29.7 P
[51] Int. Cl.² ......................................... C08L 91/00
[58] Field of Search ........... 260/27 BB, 23 R, 876 B

[56] References Cited
UNITED STATES PATENTS

| | | | |
|---|---|---|---|
| 3,239,478 | 3/1966 | Harlan............................ | 260/876 B |
| 3,294,775 | 12/1966 | Wasserman...................... | 260/100 |
| 3,325,430 | 6/1967 | Grasley........................... | 260/876 B |
| 3,441,530 | 4/1969 | Bauer.............................. | 260/876 B |
| 3,465,063 | 9/1969 | Hassell............................ | 260/876 B |
| 3,518,214 | 6/1970 | Wheelus........................... | 260/27 R |

*Primary Examiner*—Lewis T. Jacobs
*Assistant Examiner*—William E. Parker
*Attorney, Agent, or Firm*—Cooper, Dunham, Clark, Griffin & Moran

[57] ABSTRACT

This invention provides a concentrated latex of synthetic rubbers almost without causing precipitation or coagulation of the latex components.

This invention also provides the method for the preparation of concentrated latex of synthetic rubbers, particularly of concentrated latex of synthetic rubbers selected from the group consisting of aliphatic conjugated diene ploymers, block copolymers composed of a non-elastic polymer block and an elastic polymer block, monovinyl aromatic hydrocarbon-aliphatic conjugated diene random copolymers, monovinyl aromatic hydrocarbon-aliphatic conjugated diene binary block copolymers and mixtures of at least two kinds of polymers mentioned above, said method comprising effecting the emulsification in the presence as the emulsifying agent of (a) a higher fatty acid or a salt thereof rosin acid or a salt thereof, or a disproportioned rosin acid or a salt thereof and (b) a compound represented by the general formula

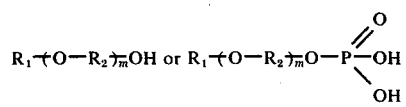

wherein $R_1$ is alkyl having 8–18 carbons or alkylphenyl in which the alkyl has 8–12 carbons, $R_2$ is alkylene having 2–5 carbons and m is an integer from 3 to 50.

11 Claims, No Drawings

CONCENTRATED LATEX OF SYNTHETIC RUBBERS AND THE METHOD FOR THE PREPARATION THEREOF

BACKGROUND OF THE INVENTION

1. Field of the Invention

This invention relates to a latex and the method for the preparation thereof. More particularly, it is concerned with a concentrated latex of synthetic rubbers and the method for the preparation thereof.

2. Description of the Piror Art

As exemplified by styrene-butadiene copolymer latex, synthetic rubber latex is usually prepared by emulsion polymerization and widely used in practice. On the other hand, progress of polymerization technique has recently produced a variety of characteristic solution-polymerized synthetic rubbers, which have been made attempts at the use in latex. General procedures for the preparation of latex from such a solution-polymerized synthetic rubber involve dissolving a solution of polymerized rubber or a solid rubber in an appropriate solvent, adding an emulsifier and water to the solution followed by emulsification and removing the solvent from the emulsion by stripping, flushing or distillation. The latex thus obtained, which is a so-called dilute latex, should then be concentrated for conventional use by such a process as creaming or centrifugal separation.

One of the typical synthetic rubbers obtained by solution polymerization is block copolymers in which an elastic polymer block and a non-elastic polymer block are alternately arranged. They are represented by A-B-A, (A-B)n, B-(A-B)n, A-(B-A)n and A-B-(B-A)n wherein A is a non-elastic polymer block usually having a second order transition temperature of 25° C. or higher, B is an elastic polymer block usually having a second order transition temperature of 10° C. or lower and n is an integer 2 or more, which are called thermoplastic elastomer and usually have large strength and elongation and a low residual strain comparable to the ordinary vulcanized rubber, without having been subjected to bridging, for example, with a sulfur compound.

Progress of polymerization technique in recent years has also enabled production of a variety of monovinyl aromatic hydrocarbon-aliphatic diene copolymers by means of a solution polymerization process. For example, whereas styrene-butadiene copolymers made by emulsion polymerization contain only randomly combined styrene and butadiene, there are produced in the anion living polymerization, for example, employing an organolithium compound, copolymers ranging from one with styrene and butadiene randomly combined to one respectively with styrene and butadiene blockly combined. Whereas bonding of the butadiene moiety in emulsion-polymerized styrene-butadiene copolymers is mainly composed of trans 1,4-bond, it is possible in the solution-polymerized copolymers to modify bonding of the butadiene moiety in a wide range depending upon the solvent and the catalyst selected, thereby producing one with predominant trans 1,4-bond or one mainly with 1,2-vinyl bond. Thus, unlike emulsion polymerization for styrene-butadiene copolymers, it is possible according to the solution polymerization to produce styrene-butadiene copolymers of widely varied structures with a variety of physical characteristics. For example, vulcanization product from rubber using a styrene-butadiene random copolymer produced by the polymerization in a hydrocarbon solvent in the presence of an alkyllithium catalyst is excellent in impact resilience and abrasion resistance; rubber compound using a styrene-butadiene block copolymer made by a solution polymerization process is characterized by a high hardness and excellent low-temperature properties.

Latex of the block copolymers represented by the abovementioned general formulae and latex of the aforesaid solution-polymerized styrene-butadiene copolymers are utilized in a wide variety of uses such as dip molding, cast molding, form rubber, rubber thread, finished paper, carpet-sizing agent, fiber-processing agent, surface-coating agent, adhesive, paint binder, latex-containing asphalt and cement-compounding ingredient.

However, it is not easy to produce latex of this nature in concentrated state. In preparing concentrated latex from solid rubber by the method as set forth above, prevention of precipitation or coagulation of rubber by aggregation of particles during the production is generally a matter of fundamental importance. Such precipitation and coagulation could occur under various conditions, for example, in association with change in external conditions such as heat or mechanical pressure. They are liable to be noticeable especially when the dilute latex is concentrated by a process such as creaming or centrifugal separation. However, as disclosed in Japanese Patent Publications 20430/1964, 12626/1966 and 34261/1970, the problem will not be critical or can be solved by selection of an appropriate emulsifier in the production of concentrated latex from most of solid rubbers such as polyisoprene, isobutylene-isoprene copolymers, ethylene-propylene copolymers and ethylene-propylene terpolymers.

On the other hand, although the above-mentioned block copolymers and the above-mentioned styrene-butadiene copolymers can be processed in the same way as other solid rubber to a dilute latex, concentration of said latex tends to be associated with much precipitation or coagulation so that not only the production will be much reduced but also there will be produced only a product with a very low mechanical stability.

More particularly, a good emulsion is produced when a solution of the above-mentioned copolymers is emulsified by means of an emulsifier in the presence of an emulsifying agent selected from the following members; Anionic surface active agent including fatty acid salt soaps or rosin acid soap such as potassium oleate, sodium laurate, potassium palmitate and sodium rosinate, or higher alcohol sulfate salts such as sodium octyl-sulfate and sodium lauryl-sulfate, alkylbenzenesulfonate salts such as sodium dodecylbenzenesulfonate and sodium octylbenzenesulfonate and aliphatic alcohol phosphate salts such as sodium octyl alcohol phosphate, or cationic surface active agents including aliphatic amine hydrochlorides such as octylamine hydrochloride, dodecylamine hydrochloride and laurylmethylamine hydrochloride, quaternary ammonium salts such as octyltrimethylammonium bromide, dioctyldimethylammonium chloride and benzyldimethyloctylammonium chloride and alkylpyridinium salts such as dodecylpyridinium chloride and hexadecylpyridinium chloride. During the subsequent step for removing the solvent from said emulsion by distillation, however, 5–10% (in the case of the above-mentioned block copolymers) or 3–8% (in the case of the above-mentioned styrene-butadiene copolymers) in terms of the initially charged copolymer of the particles will be precipitated or coagulated. Moreover, during the step for concentrating the dilute latex obtained by the solvent removal by means of creaming or centrifugal separation, 80–100% (in the case of the above-mentioned block copolymers) or 20–60% (in the case of the above-mentioned styrene-butadiene copolymers) of the particles will be precipitated or coagulated so that it is absolutely difficult to obtain a concentrated latex.

The low mechanical stability for latex of the above-mentioned block copolymers is not clearly understood for mechanism. However, according to Japanese Patent Publication 27738/1965, it is described that the low stability is due to the shape of fine particles produced on emulsification which form non-spheroid, for example, discoid or acorn owing to strong internal orientation characteristic of the block copolymer of this nature. There is disclosed in said patent publication a method for prevention of the precipitation or coagulation comprising treatment of the dilute latex with a liquid aliphatic hydrocarbon prior to concentration. The method involves steps of adding to a dilute latex of the block copolymer a liquid aliphatic hydrocarbon being solvent only for the elastic blocks but not for the non-elastic blocks at a ratio by weight from 1:1 to 5:1 is terms of said hydrocarbon to said block copolymer, effecting the contact for at least ¼ hour, then removing the aliphatic hydrocarbon and subsequently effecting the concentration. It is stated that such a treatment produces particles in nearly spheroidal form and increases the stability to a degree sufficient to be concentrated. However, the method is not satisfactory in that it is time-consuming and complicated in procedure and more effective methods are desired to be developed.

SUMMARY OF THE INVENTION

It is an object of this invention to provide latex with a high mechanical stability while extremely reducing coagulation or precipitation of particles which is associated with the production of concentrated latex of the copolymers as stated above.

The object is achieved by effecting production of concentrated latex of synthetic rubbers with an emulsified dispersion of synthetic rubbers in a latex system in the presence as the emulsifying agent of (a) a higher fatty acid or a salt thereof, rosin acid or a salt thereof, or a disproportioned rosin acid or a salt thereof and (b) a compound represented by the general formula

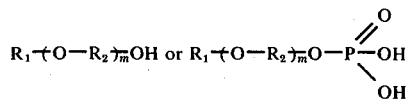

wherein $R_1$ is alkyl having 8–18 carbons, $R_2$ is alkylene having 2–5 carbons and m is an integer from 3 to 50.

The emulsion thus obtained can be formed into a concentrated latex by removing the solvent by conventional solvent-removal procedures followed by concentration procedure. Coagulation or precipitation of the latex particles during these procedures is extremely low and mechanical stability of the resulting concentrated latex is high.

DESCRIPTION OF THE INVENTION

An embodiment of the copolymers used in the present invention is block copolymers represented by the general formulae A-B-A, (A-B)n, B-(A-B)n, (A-B)n-A and A-B-(B-A)n wherein A is a non-elastic polymer block having a second order transition temperature of 25° C. or higher, B is an elastic polymer block having a second order transition temperature of 10° C. or lower and n is an integer 2 or more. Said copolymers can be produced by living anion polymerization using an initiator based on an alkali metal. Preferred as the member for forming the non-elastic polymer block is a homopolymer of a monomer or a copolymer composed of two or more monomers selected from monovinyl aromatic hydrocarbons such as styrene and α-methyl-styrene. Preferable members for forming the elastic polymer block are homopolymer of a monomer or copolymers of two or more monomers selected from aliphatic conjugated diene compounds such as 1,3-butadiene and isoprene. They may be random copolymers of an aliphatic conjugated diene compound and a vinyl aromatic hydrocarbon. Such block copolymers can be produced by successively polymerizing the monomers block by block in the presence of the above-mentioned initiator, by effecting polymerization for a block copolymer of two or more monomers with different copolymerization reactivites simultaneously charged, or by coupling the living block copolymers obtained by the above-mentioned initiator. Block copolymer represented by the above-cited general formula A-B-(B-A)n can be obtained by coupling the living block copolymer A-B⁻ by means of a multifunctional coupling agent. For example, use of a tetrafunctional coupling agent such as tin tetrachloride forms a block copolymer of the structure

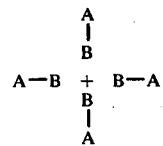

Molecular weight of the block copolymer is in the range between 10,000 and 500,000. With the molecular weight below 10,000 mechanical stability of the coating from the latex will be inferior. The molecular weights over 500,000 will produce too high viscosity of the solution on emulsification with a result that the emulsification will be incomplete or difficult to affect properties of the resulting latex adversely. Content of the component A, non-elastic polymer block portion of the block copolymer may be optional within the range between 10% and 70% by weight. The content beyond said range will be unfavorable because of poor features as a thermoplastic elastomer.

In preparing latex of said block copolymers, the polymer solution may be the polymerization solution as it is, or it may be prepared by dissolving solid rubber of said block copolymer in a solvent such as benzene, toluene, xylene, cyclohexane, cyclooctane, chloroform, carbon tetrachloride, trichlene or methane dichloride. It is preferable to use a polymer solution usually at a concentration in the range between 5% and 30% by weight.

Another embodiment of the copolymers used in the invention is monovinyl aromatic hydrocarbon-aliphatic conjugated diene copolymers, particularly solution-polymerized styrene-butadiene copolymers. As an example is mentioned a random or binary block styrene-butadiene copolymer polymerized with an alkyllithium catalyst. The styrene-butadiene random copolymer rubber can be produced by a known process such as by continuously charging an alkyllithium-catalyst polymerization system with styrene and 1,3-butadiene in an inert atmosphere at a rate slower than the polymerization velocity, or by charging an alkyllithium-catalyst polymerization system in an inert atmosphere simultaneously with styrene and 1,3-butadiene in the presence of a randomizing agent such as tetrahydrofuran, dioxane or trioxane. Styrene-butadiene binary block copolymer rubber, which is a so-called A-B type block polymer with polystyrene blocks and styrene blocks connected, can be prepared by a known process such as by charging an alkyllithium polymerization system using as the solvent a hydrocarbon compound such as hexane, benzene or toluene in an inert atmosphere simultaneously with styrene and 1,3-butadiene in which difference in polymerization velocity between styrene and 1,3-butadiene is utilized, or by charging an alkyllithium polymerization system in an inert atmosphere first with one of 1,3-butadiene and styrene for polymerization and then with the other for polymerization. The polymer solution for emulsifying these polymers is preferably used at a concentration between 5% and 30% by weight. The polymer solution may be used as it is polymerized or may be a solution of a solid rubber in an appropriate solvent.

A still another embodiment of polymers used in the invention is aliphatic conjugated diene polymers.

A further still another embodiment of the invention is the use of a mixture of two or more copolymers selected from styrenebutadiene random copolymers and styrene-butadiene block copolymers. The mixture may be a mixture of copolymers separately prepared or, as disclosed in Japanese Patent Publication 3250/1972, a copolymer mixture prepared first by producing a styrene-butadiene copolymer and then producing another styrene-butadiene copolymer in the same polymerization system. The polymer solution used for forming an emulsion of these polymer mixtures is preferably at a concentration between 5% and 30% by weight. The polymer solution may be a polymer solution as it is polymerized or a solution of a solid rubber in an appropriate solvent.

Mixtures of at least two kinds of polymers mentioned above as embodiments may be used in the present invention. Although the object of the present invention is achieved by employing the aforementioned two emulsifying agents in combination, it is more preferable for achieving the object of the invention to use the salt of rosin acid or a disproportioned rosin acid, one of the above-cited emulsifying agents, in the form of salt formed on mixing for emulsification rosin acid or a disproportioned rosin acid dissolved in a solution of said block copolymers and an aqueous solution of an alkali as the dispersing medium, or to conduct emulsification after dissolving in a solution of said block copolymers another component of the emulsifying agents, a compound of the general formula

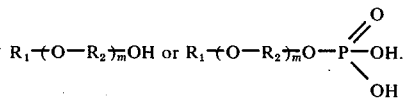

In other words, it is most preferable that in a solution of said block copolymers are dissolved (a) rosin acid or a disproportioned rosin acid and (b) a compound of the formula

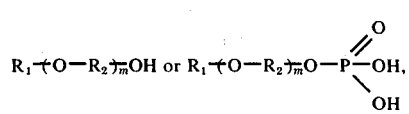

and then the solution is mixed with an aqueous solution of an alkali for emulsification.

The amount of one of the emulsifiers used in the invention, a higher fatty acid, for example, lauric acid, or rosin acid or a salt thereof, or a disproportioned rosin acid or a salt thereof is 0.5 - 15 parts by weight and preferably 1-8 parts by weight per 100 parts by weight of said copolymer. With amounts less than 0.5 parts by weight the emulsification will be hardly effected and with amounts more than 15 parts by weight too vigorous foaming will be resulted during removal of the solvent.

Illustrative of the other component of the emulsifying agents used in the invention, a compound represented by the general formula

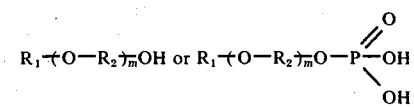

wherein $R_1$ is alkyl having 8–18 carbons or phenylalkyl in which the aklyl has 8–12 carbons, $R_2$ is alkylene having 2–5 carbons and m is an integer from 3 to 50 are polyoxyethylene nonylphenyl ether, polyoxyethylene lauryl ether, polyoxyethylene palmityl ether, phosphate ester of polyoxyethylene nonylphenyl ether and phosphate ester of polyoxyethylenepropylene nonylphenyl ether. Two or more of them may be used in combination. The phosphate ester compound represented by the general formula

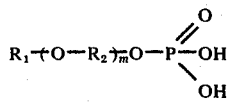

may partly contain a compound represented by

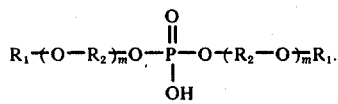

With degree of polymerization of the alkylene oxide, namely, m of the above-cited general formula is less than 3, there will be produced latex with insufficient mechanical stability. m over 50 will be unfavorable because of reduction of the emulsifying power. The amount of the compound of the above-cited general formula is 0.5–15 parts by weight and preferably 2–8 parts by weight per 100 parts by weight of the copolymer. With the amount of the compound of the above-cited general formula less than 0.5 parts by weight there will be produced no satisfactory results. The amount over 15 parts by weight is unfavorable in that foaming during the solvent removal will be vigorous and physical properties of the coating from the latex will be poor.

In preparing latex of the block copolymers represented by the aforementioned general formula the most favorable emulsifying power is attained when emulsification is conducted after mixing an alkali solution with rosin acid or a disproportioned rosin acid and a compound of the above-cited general formula dissolved in a solution of said block copolymer rather than conducting emulsification after mixing a solution of said block copolymer with the emulsifying agents dissolving in water the dispersing medium. The alkali component of the aqueous alkali solution may be an alkali metal hydroxide such as potassium hydroxide or sodium hydroxide, ammonia or a water-soluable amine such as triethanolamine or ethylamine.

The emulsifier used for emulsifying a mixture of a solution of said polymers containing the above-cited emulsifying agents and an aqueous alkali solution may be of any type and any of known emulsifiers may be used so long as it has a sufficiently high emulsifying capacity. Illustrative are homomixer, homogenizer, dispermill and colloidmill. If necessary, combination of two or more emulsifiers may be employed.

Subsequent removal of the solvent may be carried out by a known solvent-removing process such as distillation by jacket heating or steam distillation by directly introducing steam into the latex solution.

The dilute latex thus obtained usually contains solid at a concentration between 10% and 40% by weight. In order to form concentrated latex of a solid content between 40% and 70% by weight procedures such as creaming, centrifugal separation or water evaporation may be applied. Especially preferable is concentration by means of a centrifuge because of its efficiency and reproduceability. According to the present invention, precipitation of the latex particles by coagulation is very low and the concentration is easily conducted by any of the above-mentioned processes.

In preparing latex of a solution-polymerized styrenebutadiene copolymer it is preferable to employ the emulsifying agents having been dissolved in a solution of the copolymer prior to the emulsification. Aqueous phase prior to the emulsification should be an aqueous alkali solution, in which the alkali component employed may be any of alkal metal hydroxides such as sodium hydroxide, lithium hydroxide and potassium hydroxide, ammonia and water-soluble amines such as triethanolamine and ethylamine. The amount of said alkali component employed is in a ratio from 0.2 to 20 equivalents and preferably from 0.5 to 5 equivalents per equivalent of the higher fatty acid, rosin acid or salt thereof, or disproportioned rosin acid or salt thereof. With amounts of the alkali component used less than 0.2 equivalents there will be produced no good emulsion. With amounts more than 20 equivalents an excess of the alkali will remain in the latex which is unfavorable due to poor physical properties of the resulting latex. However, these disadvantages will be less even with more amount of the alkali employed when an alkali readily evaporated during solvent removal and concentration such as, for example, ammonia.

The emulsifier used for a solution of the copolymer containing the aforementioned emulsifying agents and an aqueous alkali solution may be of any type and any of known emulsifiers may be used so long as it has a sufficiently high emulsifying capacity. Illustrative are homomixer, homogenizer, dispermill and colloidmill. If necessary, combination of two or more emulsifiers may be employed.

Subsequent removal of the solvent may be carried out by a known solvent-removing process such as distillation by jacket heating or steam distillation by directly introducing steam into the latex solution.

The concentrated latex prepared according to the present invention can be utilized for a wide variety of uses such as dip molding, foam rubber, rubber thread, processed paper, carpet-sizing agent, fiber-processing agent, surface-coating agent, adhesive, pain binder, latex-containing asphalt and cement-compounding ingredient.

In employing the concentrated latex for the above-cited uses, natural rubber or other synthetic rubber latex may be combined with, if desired. An emulsion or aqueous solution of plastics such as urethane resin, acryl resin, epoxy resin, vinyl acetate resin, ethylene-vinyl acetate copolymer resin, alkyl resin, phenol resin, melamine resin, unsaturated polyester resin and the like may also be used in combination.

Viscosity of the latex obtained according to this invention can be increased by addition of a thickener without reducing the stability. As the thickner may be employed methylcellulose, carboxymethylcellulose, hydroxyethylcellulose, casein, polyvinyl alcohol, polyacrylic acid or derivatives thereof, sodium and ammonium salts of polyacrylic acid and the like.

To the latex obtained according to the invention may also be added an anti-freezing agent such as ethylene glycol or glycerine.

If desired, compounding ingredients such as softener, filler, tack agent, age resistor, colorant and the like may be compounded to the latex obtained in the invention.

As the softener are mentioned petroleum hydrocarbon oils of paraffin, naphthene and aromatic series, liquid paraffin, spindle oil, synthetic ester softeners such as dioctyl phthalate and dibutyl phthalate, higher fatty acids such as stearic acid and lauric acid and esters thereof and the like. It is also feasible in order to improve the coating properties to add a solvent of a higher high boiling point being good solvent for block copolymers such as xylene, ethylbenzene, decaline or tetraline and removing the solvent by evaporation after the coating formation.

The filler includes inorganic fillers such as aluminum carbonate, clay, talc, hydrated silicic acid, silica, magnesia, zinc oxide, carbon black and barium sulfate and synthetic resins such as phenol-formaldehyde resin, resorcinol-formaldehyde resin, polystyrene and polyethylene.

As the adhesive may be employed natural rosin, degenerated rosin, coumarone-indene resin, terpene resin, hydrocarbon resins, cyclopendadiene resin and the like.

Suitable age resistors are those generally used in rubber industry. Inorganic and organic colorants may be employed if necessary.

The latex produced according to the invention normally provides coating with sufficiently high mechanical strength and elongation even without vulcanization process with a vulcanizing agent. In some uses, however, it is possible, if necessary, to effect vulcanization in the same way as with conventional synthetic rubber latex by adding compounding ingredients such as a vulcanizing agent, vulcanization accelerator and vulcanization additives.

Illustrative of the vulcanization agent are sulfur, thiuram polysulfides, and 4,4'-dithiomorpholine. Illustrative of the vulcanization accelerator are thiuram accelerators such as tetraalkylthiuram monosulfides and tetraalkylthiuram polysulfides, dithiocarbamate salts such as zinc dialkyldithiocarbamates and sodium dialkyldithiocarbamates, xanthates such as zinc butylxanthate, sulfenamides such as cyclohexylbenzothiazylsulfenamide and thiazole accelerators such as mercaptobenzothiazole and dibenzothiazyl disulfide. AS the vulcanization activator is used zinc oxide. It is preferable to add these compounding ingredients in aqueous solution or dispersion to the latex of the invention.

DESCRIPTION OF PREFERRED EMBODIMENTS

The following examples will illustrate the invention in greater detail, and it is to be understood that the invention is not to be limited thereto.

EXAMPLE 1

To a 20% by weight n-hexane solution containing 100 parts by weight of 50:50 by weight monomer mixture of 1,3-butadiene and styrene was added under nitrogen 0.22 parts by weight of n-butyllithium as the active lithium. The mixture was polymerized at 55° C. for 24 hrs. to a copolymer with 99% or more of the entire monomers copolymerized. To the active copolymer solution was then added a 20% by weight n-hexane solution containing 143 parts of 65:35 by weight 1,3-butadiene-styrene monomer mixture. The mixture was polymerized at 70° C. for 5 hours to a copolymer with 99% or more of the additional monomer mixture copolymerized. To the resulting copolymer was added 0.53 parts of phenyl-$\beta$-naphthylamine to prepare an elastic polymer as shown in Japanese Patent Publication 27822/1969. In a toluene solution of said block copolymer (polymer concentration 10% by weight) were dissolved 0.3% of a disproportioned rosin acid (3 parts by weight per 100 parts of the polymer) and 5 parts by weight per 100 parts of the polymer of polyoxyethylene nonylphenyl ether with an average degree of polymerization for the oxyethylene of 15. The solution and an aqueous solution containing sodium hydroxide equimolar to the disproportioned rosin acid are introduced at a ratio by weight of 1:1 continuously into a dispermill by means of a pressure pump for emulsification. The resulting toluene-containing emulsion was immediately passed to a toluene-removing tank equipped with a heating jacket in which the toluene was removed by evaporation. A portion of the water was simultaneously evaporated to give a dilute latex with a solid concentration of 13.1% by weight. The latex was passed to a cylinder-type centrifuge which was operated at about 12,000 r.p.m. (about 6,000 G) to give a concentrated latex (solid concentration 54% by weight). The amounts of the block copolymer precipitated by coagulation during the toluene evaporation step and the centrifuge concentration step were 1% by weight and 0.3% by weight, respectively. Mechanical stability of the resulting concentrated latex was 1000 sec. (JISK-6381).

EXAMPLE 2

Preparation of a concentrated latex was made in entirely the same way as in Example 1 except that amount of the polyoxyethylene nonylphenyl ether (average degree of polymerization for the oxyethylene of 15) among the emulsifying agents employed in Example 1 was 2 parts by weight (solid concentration 56% by weight). Amounts of the block copolymer precipitated by coagulation during the solvent-removing step and the centrifugal concentration step were 1.5% by weight and 1.0% by weight, respectively. Mechanical stability of the concentrated latex was 900 sec.

EXAMPLE 3

Preparation of a concentrated latex was made in entirely the same way as in Example 1 except that 3 parts by weight of polyoxyethylene lauryl ether (average degree of polymerization for the oxyethylene of 15) was employed in place of the polyoxyethylene nonylphenyl ether among the emulsifying agents employed in Example 1 (solid content 55% by weight). Amounts of the block copolymer precipitated by coagulation during the solvent-removing step and the centrifugal concentration step were 1.7% by weight and 1.5% by weight, respectively. Mechanical stability of the concentrated latex was 800 sec.

EXAMPLE 4

Preparation of a concentrated latex was made in entirely the same way as in Example 1 except that 2 by weight of polyoxypropylene decylphenyl ether (average degree of polymerization for the oxypropylene of 15) was employed in place of the polyoxyethylene nonylphenyl ether, one of the emulsifying agents in Example 1 and amount of the sodium hydroxide was 2 moles per mole of the rosin acid (solid concentration 55% by weight). Amounts of the block copolymer precipitated by coagulation during the solvent-removing step and the centrifugal concentration step were 1.6% by weight and 0.3% by weight, respectively. Mechanical stability of the concentrated latex was 860 sec.

EXAMPLE 5

Preparation of a concentrated latex was made in entirely the same way as in Example 1 except that amount of the rosin acid, one of the emulsifying agents in Example 1 was 1 part by weight and 2 parts by weight of polyoxypropylene palmityl ether (average degree of polymerization for the oxypropylene of 10) was employed in place of the polyoxyethylene nonylphenyl ether (solid concentration 52% by weight). Amounts of the block copolymer precipitated by coagulation during the solvent-removal and centrifugal separation concentration step were 2.0% by weight and 1.5% by weight, respectively. Mechanical stability of the concentrated latex was 700 sec.

EXAMPLE 6

Preparation of a concentrated latex was made in entirely the same way as in Example 2 except that ammonia is a ratio of 3 moles per mole of the disproportioned rosin acid was dissolved in water (solid concentration 54% by weight). Amounts of the block copolymer precipitated by coagulation during the solvent-removing step and the centrifugal separation step were 1.5% by weight and 1.4% by weight, respectively. Mechanical stability of the concentrated latex was 800 sec.

EXAMPLE 7

Preparation of a concentrated latex was made in entirely the same way as in Example 6 except that ethylamine in a ratio of 3 moles per mole of the disproportioned rosin acid was employed in place of the ammonia in Example 6 (solid concentration 54% by weight). Amounts of the block copolymer precipitated by coagulation on solvent removal and centrifugal separation were 1.8% by weight and 1.7% by weight, respectively. Mechanical stability of the concentrated latex was 840 sec.

EXAMPLE 8

Preparation of a concentrated latex was made in entirely the same way as in Example 2 except that polyoxyethylene nonylphenyl phosphite (average degree of polymerization for the oxyethylene of 30) was used in place of the polyoxyethylene nonylphenyl ether one of the emulsifying agents in Example 2 and potassium hydroxide in place of the sodium hydroxide (solid concentration 56% by weight). Amounts of the block copolymer precipitated by coagulation on solvent removal and centrifugal separation concentration were 2.0% by weight and 1.6% by weight, respectively. Mechanical stability of the concentrated latex was 700 sec.

EXAMPLE 9

Preparation of a concentrated latex was made in entirely the same way as in Example 2 except that cyclohexane was employed in place of the toluene, the solvent in Example 2 (solid concentration 53% by weight). Amounts of the block copolymer precipitated by coagulation on solvent removal and centrifugal separation concentration were 1.3% by weight and 1.1% by weight, respectively. Mechanical stability of the concentrated latex was 1000 sec.

EXAMPLE 10

Preparation of a concentrated latex was made in entirely the same way as in Example 2 except that a 20% benzene solution of the polymer was used in place of the 10% toluene solution of the polymer (solid concentration 57% by weight). Amounts of the block copolymer precipitated by coagulation on solvent removal and centrifugal separation concentration were 2.0% by weight and 1.8% by weight, respectively. Mechanical stability of the concentrated latex was 750 sec.

EXAMPLE 11

In a 10% weight n-hexane solution of the block copolymer polymerized according to Example 1 were dissolved 3 parts by weight of a disproportioned rosin acid and 5 parts by weight of polyoxyethylene nonylphenyl ether (average degree of polymerization for the oxyethylene of 6) as the emulsifying agent. The solution in admixture with the same aqueous alkali solution as in Example 1 was emulsified followed by preparation of a concentrated latex by conventional procedures (solid concentration 56% by weight). Amounts of the block copolymer precipitated by coagulation on solvent removal and centrifugal separation concentration were 1.1% by weight and 0.8% by weight, respectively. Mechanical stability of the concentrated latex was 960 sec.

EXAMPLE 12

A star-shaped A-B-(B-A)n block copolymer as disclosed in British Patent 985,614 was prepared by the following procedures: To a 10% by weight toluene solution containing 30 parts by weight of styrene was added under nitrogen 0.2 parts by weight of n-butyllithium as the active lithium. The mixture was polymerized at 50° C. for 5 hrs. to a polymer with 99% or more of the added styrene polymerized. A 10% by weight toluene solution containing 70 parts by weight of 1,3-butadiene was then added and the mixture was polymerized at 50° C. for 7 hrs. to a polymer with 99% or more of the added 1,3-butadiene polymerized. A coupling reaction was conducted without losing the activity following addition of 0.4 parts by weight of silicone tetrachloride. To the block copolymer solution was added 0.53 parts by weight of phenyl-β-naphthylamine as the stabilizer, followed by preparation of a block copolymer latex in the same way as in Example 1. Amounts of the block copolymer precipitated by coagulation during the solvent-removal step and the centrifugal separation concentration step were 1.0% by weight and 0.4% by weight, respectively. Mechanical stability of the concentrated latex was 1000 sec.

REFERENCE EXAMPLE 1

Preparation of a concentrated latex was made in the same way as in Example 1 except that, in emulsifying the same block copolymer solution as in Example 1, 3 parts by weight of sodium salt of a disproportioned rosin acid alone was dissolved in the aqueous phase. Amounts of the copolymer precipitated by coagulation were 9.5% by weight and 65% by weight, respectively. Preparation of the concentrated latex was difficult.

REFERENCE EXAMPLE 2

Preparation of a concentrated latex was made in the same way as in Example 1 except that 5 parts by weight of polyethylene nonylphenyl ether (average degree of polymerization for the oxyethylene of 15) was used alone in place of the emulsifying agent used in Example 1. Amounts of the block polymer precipitated by coagulation were 53% by weight and 28% by weight, respectively. Preparation of the concentrated latex was difficult.

The present invention enables very easy preparation of concentrated latex of block copolymers represented by the formula A-B-A, (A-B)n, B-(A-B)n, (A-B)n-A or A-B-(B-A)n wherein A is a non-elastic polymer block having a second order transition point of 25° C. or higher, B is an elastic polymer block having a second order transition point of 10° C. or lower and n is an integer 2 or more.

EXAMPLE 13

A styrene-butadiene random copolymer was prepared as follows: To 3 l. of toluene heated to 110° C. was added in an inert atmosphere 0.8 g. of n-butyllithium as the active lithium compound, immediately followed by continuous introduction of a toluene solution containing 15% by weight of 4:1 1,3-butadiene-styrene monomer mixture at a rate of 0.11 kg./min. for 60 min. The polymerization was made at 110° C. To the resulting polymer solution was added 0.5 phr of 2,6-ditertiary-butyl-p-cresol as the stabilizer. The resulting polymer was a random copolymer containing 25% combined styrene with a Mooney viscosity (ML $_{1+4}^{100°C}$) of 50.

To a toluene solution of said random copolymer (polymer concentration 10% by weight) was added rosin acid in a ratio of 5 parts by weight per 100 parts by weight of said copolymer followed by addition of polyoxyethylene nonylphenyl ether having a degree of polymerization for the polyoxyethylene to a solution.

The copolymer solution containing the emulsifying agent was mixed with an aqueous solution containing sodium hydroxide in an equimolar amount to the rosin acid in a weight ratio of 1:1. The mixture was emulsified in a dispermill. The resulting emulsion was immediately introduced into a toluene-removal tank equipped with a heating jacket in which the toluene was removed by evaporation. A part of the water was evaporated simultaneously with the toluene to give a dilute latex of a solid content of 13.5% by weight. While continuously introducing the latex into a cylinder centrifuge, the centrifuge was operated at about 12,000 r.p.m. (about 6000 G) to produce a concentrated latex with a solid content of 55% by weight. Amounts of the copolymer precipitated by coagulation in the toluene evaporation removal step and the centrifugal separation concentration step were 0.8% by weight and 0.1% by weight respectively. Mechanical stability (JISK-6381) of the resulting concentrated latex was 1200 sec.

EXAMPLE 14

Preparation of a concentrated latex was made in the same way as in Example 13 except that amount of the polyoxyethylene nonylphenyl ether used in Example 13 was changed to 3 parts by weight. Solid content of the concentrated latex was 52% by weight. Amounts of the random copolymer precipitated by coagulation on solvent removal and concentration were 1.2% and 0.3%, respectively. Mechanical stability of the concentrated latex was 900 sec.

EXAMPLE 15

Preparation of a concentrated latex was made in the same way as in Example 13 except that the polyoxyethylene nonylphenyl ether was substituted with phosphate ester of polyoxyethylene nonylphenyl ether with a degree of polymerization for the polyoxyethylene of 6. Solid concentration of the concentrated latex was 53% by weight. Amounts of said random copolymer precipitated by coagulation on solvent removal and concentration were 1.0% and 0.2%, respectively. Mechanical stability of the concentrated latex was 1000 sec.

REFERENCE EXAMPLE 3

Preparation of a concentrated latex was made in the same way as in Example 13 except that 5 parts of sodium rosinate per 100 parts of said copolymer alone was dissolved in the aqueous phase in place of the emulsifying agent used in Example 13 and a mixture of the random copolymer solution containing no emulsifying agent with said aqueous solution of sodium rosinate was emulsified. Solid concentration of the concentrated latex was 51% by weight. Amounts of said random copolymer precipitated by coagulation on solvent removal and concentration were 5% and 51%, respectively. Mechanical stability of the concentrated latex was 30 sec.

EXAMPLE 16

A styrene-butadiene binary block copolymer was prepared as follows: To 10 kg. of a toluene solution containing 10% by weight of 4:1 1,3-butadiene-styrene monomer mixture was added in an inert atmosphere 0.85 g. of n-butyllithium as the active lithium compound. The polymerization was made at 70° C. for 4 hrs., followed by addition of 0.5 phr of 2,6-di-tertiary-butyl-p-cresol as the stabilizer. The resulting polymer was a block copolymer containing 25% of combined styrene with a Mooney viscosity (ML $_{1+4}^{100°C}$) of 45.

A concentrated latex of said block copolymer was prepared using the same emulsifying agent and procedures as in Example 13 except that the random copolymer solution in Example 13 was substituted with a tuluene solution of said block copolymer (polymer concentration 10% by weight). Solid concentration of the concentrated latex was 54% by weight. Amounts of said block copolymer precipitated by coagulation on solvent removal and concentration were 1.0% and 0.2%, respectively. Mechanical stability of the concentrated latex was 1100 sec.

EXAMPLE 17

Preparation of a concentrated latex was made in the same way as in Example 16 except that phosphate ester of polyoxyethylene nonylphenyl ether with a degree of polymerization for the polyoxyethylene of 6 was used in place of the polyoxyethylene nonylphenyl ether used in Example 16. Solid concentration of the concentrated latex was 53% by weight. Amounts of said block copolymer precipitated by coagulation on solvent removal and concentration were 0.8% and 0.1%, respectively. Mechanical stability of the concentrated latex was 1000 sec.

REFERENCE EXAMPLE 4

Preparation of a concentrated latex was made in the same way as in Example 16 except that 6 parts by weight of sodium rosinate per 100 parts by weight of said copolymer alone was dissolved in the aqueous phase in place of the emulsifying agent used in Example 16 and a mixture of the block copolymer solution shown in Example 16 containing no emulsifying agent with said aqueous solution of sodium rosinate was emulsified. Solid concentration of the concentrated latex was 55% by weight. Amounts of said block copolymer precipitated by coagulation on solvent removal and concentration were 7% and 65%, respectively. Mechanical stability of the concentrated latex was 15 sec.

As seen from the above, the present invention enables very easy preparation of latex of solution-polymerized styrene-butadiene copolymers. The concentrated latex thus obtained is excellent in mechanical stability.

EXAMPLE 18

A mixture of a styrene-butadiene random copolymer and a styrene-butadiene binary block copolymer was prepared as follows: To 3 l. of toluene heated to 110°C. was added in an inert atmosphere 0.9 g. of n-butyllithium as the active lithium compound, immediately followed by continuous introduction of a toluene solution containing 15% by weight of 10:1 1,3-butadiene-styrene monomer mixture at a rate of 0.14 kg./min. for 50 min. The polymerization was made at 110° C. to give a random copolymer solution containing 10% combined styrene. After introducing 1.8 g. of n-butyllithium as the active lithium compound while maintaining the activity, 16 kg. of a toluene solution containing 10% by weight of 2:3 1,3-butadiene-styrene monomer mixture was added in one portion. The polymerization was made at 80° C. for 5 hrs. After completion of consumption of the introduced monomers 0.5 phr of 2,6-di-tertiarybutyl-p-cresol was added.

The resulting styrene-butadiene copolymer mixture contains 40% combined styrene and has a Mooney viscosity $(ML_{1+4}^{100°C.})$ of 35.

To a solution of the styrene-butadiene copolymer mixture (concentration of the polymer 10% by weight) was added rosin acid in a ratio of 5 parts by weight per 100 parts by weight, followed by addition of polyoxyethylene nonylphenyl ether with a degree of polymerization for the polyoxyethylene of 15 in a ratio of 5 parts by weight per 100 parts by weight of said copolymer mixture. A 1:1 by weight mixture of the solution copolymer mixture and an aqueous solution containing sodium hydroxide in an amount equimolar to rosin acid was emulsified in a dispermill. The resulting emulsion was immediately introduced into a toluene-removal tank equipped with a heating jacket in which the toluene was then removed by evaporation. A portion of the water was evaporated simultaneously with the toluene to give a dilute latex with a solid concentration of 13.5% by weight. While continuously introducing the latex into a cylinder centrifuge the centrifuge was operated at about 12,000 r.p.m. (about 6000 G) to give a concentrated latex with a solid content of 54% by weight. Amounts of the copolymer precipitated by coagulation in the toluene evaporation removal step and the centrifugal separation step were 0.5% by weight and 0.1% by weight, respectively. Mechanical stability (JISK-6381) of the resulting concentrated latex was 1000 sec.

EXAMPLE 19

Preparation of a concentrated latex was made in the same way as in Example 18 except that amount of the polyoxyethylene nonylphenyl ether used in Example 18 was changed to 3 parts by weight. Solid concentration of the concentrated latex was 52% by weight. Amounts of said random copolymer precipitated by coagulation were 1.0% and 0.3%, respectively. Mechanical stability of the concentrated latex was 900 sec.

EXAMPLE 20

Preparation of a concentrated latex was made in the same way as in Example 18 except that the polyoxyethylene nonylphenyl ether used in Example 18 was substituted with phosphate ester of polyoxyethylene nonylphenyl ether with a degree of polymerization for the polyoxyethylene of 6. Solid concentration of the concentrated latex was 54.5% by weight. Amounts of said random copolymer precipitated by coagulation on solvent removal and concentration were 0.8% and 0.1%, respectively. Mechanical stability of the concentrated latex was 900 sec.

REFERENCE EXAMPLE 5

Preparation of a concentrated latex was made in the same way as in Example 18 except that 5 parts by weight of sodium rosinate per 100 parts by weight of said copolymer mixture alone was dissolved in the aqueous phase and a mixture of the copolymer mixture solution shown in Example 18 containing no emulsifying agent and said aqueous solution of sodium rosinate was emulsified. Solid concentration of the concentrated latex was 51% by weight. Amounts of said random copolymer precipitated by coagulation on solvent removal and concentration were 5% and 51%, respectively. Mechanical stability of the concentrated latex was 30 sec.

EXAMPLE 21

A styrene-butadiene random copolymer was prepared as follows: To 3 l. of toluene heated to 110° C. was added in an inert atmosphere 0.8 g. of n-butyllithium as the active lithium compound, immediately followed by continuous introduction of a toluene solution containing 15% by weight of 4:1 1,3-butadiene-styrene monomer mixture at a rate of 0.11 kg./min. for 60 min. The polymerization was made at 110° C. To the resulting polymer solution was added 0.5 phr of 2,6-ditertiary-butyl-p-cresol as the stabilizer. The resulting polymer was a random copolymer containing 25% combined styrene with a Mooney viscosity $(ML_{1+4}^{100°C.})$ of 50.

A styrene-butadiene binary block copolymer was prepared as follows: To 10 kg. of a toluene solution containing 10% by weight of 4:1 1,3-butadiene-styrene monomer mixture was added in an inert atmosphere 0.85 g. of n-butyllithium as the active lithium compound. The polymerization was made at 70° C. for 4 hrs., followed by addition of 0.5 phr of 2,6-di-tertiarybutyl-p-cresol as the stabilizer. The resulting polymer was a block copolymer containing 25% combined styrene with a Mooney viscosity $(ML_{1+4}^{100°C.})$ of 45.

Equal amounts of the styrene-butadiene random copolymer and styrene-butadiene binary block copolymer produced as above were mixed and the copolymer mixture was used for the preparation of a concentrated latex.

The concentrated latex was prepared in the same way as in Example 18 except that a toluene solution of said copolymer mixture was employed. There was produced a concentrated latex with a solid concentration of 52% by weight. Amounts of the copolymer mixture precipitated by coagulation on solvent removal and concentration were 1.2% and 0.3%, respectively. Mechanical stability of the concentrated latex was 1100 sec.

EXAMPLE 22

Preparation of a concentrated latex was made in the same way as in Example 20 except that the copolymer mixture of Example 4 was used.

Solid content of the concentrated latex was 55% by weight. Amounts of the copolymer mixture precipitated by coagulation on solvent removal and concentration were 0.9% and 0.2%, respectively. Mechanical stability of the concentrated latex was 1000 sec.

We claim:
1. A concentrated aqueous latex comprising:
   1. at least one block copolymer selected from the group consisting of block copolymers having a molecular weight of from 10,000 to 500,000 and the general configuration:
   A-B-A; $(A-B)_n$; $B-(A-B)_n$
   $A-(B-A)_n$ and $A-B-(B-A)_n$
   wherein n is an integer of at least 2, A is a non-elastic polymer or copolymer containing styrene or α-methyl styrene and having a second order transition temperature of at least 25° C, and B is an elastic polymer or copolymer containing 1,3-butadiene or isoprene having a second order transition temperature up to 10° C, the A- content of said block copolymer being from 10% to 70% by weight based on the total weight of said copolymer;
   2. an emulsifying agent which is a mixture of:
      a. from 0.5 to 15 parts by weight per 100 parts by weight of polymer of a higher fatty acid or a salt thereof, rosin acid or a salt thereof, or a disproportioned rosin acid or a salt thereof; and
      b. from 0.5 to 15 parts by weight per 100 parts by weight of polymer of a compound represented by the general formula

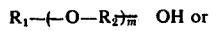 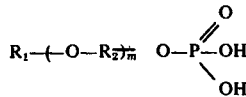

wherein $R_1$
   is alkyl having 8–18 carbons or alkylphenyl in which the alkyl has 8–12 carbons, $R_2$ is alkylene having 2–5 carbons and m is an integer from 3 to 50.
2. A method of the preparation of a concentrated aqueous latex comprising:
   1. at least one block copolymer selected from the group consisting of block copolymers having a molecular weight of from 10,000 to 500,000 and the general configuration:
   A-B-A; $(A-B)_n$; $B-(A-B)_n$
   $A-(B-A)_n$ and $A-B-(B-A)_n$
   wherein n is an integer of at least 2, A is a non-elastic polymer or copolymer containing styrene or α-methyl styrene and having a second order transition temperature of at least 25° C, and B is an elastic polymer or copolymer containing 1,3-butadiene or isoprene having a second order transition temperature up to 10° C, the A- content of said block copolymer being from 10% to 70% by weight based on the total weight of said copolymer;
   2. an emulsifying agent which is a mixture of:
      a. from 0.5 to 15 parts by weight per 100 parts by weight of polymer of a higher fatty acid or a salt thereof, rosin acid or a salt thereof, or a disproportioned rosin acid or a salt thereof; and
      b. from 0.5 to 15 parts by weight per 100 parts by weight of polymer of a compound represented by the general formula

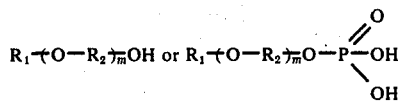

wherein $R_1$
   is alkyl having 8–18 carbon or alkylphenyl in which the alkyl has 8–12 carbons, $R_2$ is alkylene having 2–5 carbons and m is an integer from 3 to 50;
   which method comprises dissolving the emulsifying agent in an aqueous solution of the block copolymer and emulsifying by the addition of an aqueous alkali solution.
3. A concentrated aqueous latex of claim 1 containing a salt of rosin acid or a salt of a disproportional rosin acid.
4. A concentrated aqueous latex of claim 1 containing a higher fatty acid or a salt thereof.
5. A concentrated aqueous latex of claim 1 additionally containing a solution polymerized styrene-butadiene random copolymer.
6. A concentrated aqueous latex of claim 1 additionally containing a solution polymerized styrene-butadiene binary block copolymer.
7. A concentrated aqueous latex of claim 1 additionally containing a solution polymerized styrene-butadiene random copolymer and a solution polymerized styrene-butadiene binary block copolymer.
8. A process as in claim 2 wherein the emulsifying agent contains a salt of rosin acid or a salt of disproportioned rosin acid.
9. A process as in claim 2 wherein the concentrated aqueous latex additionally contains solution polymerized polybutadiene or solution polymerized styrene-butadiene random copolymer.
10. A process as in claim 2 wherein the concentrated aqueous latex additionally contains solution polymerized polybutadiene or solution polymerized styrene-butadiene binary block copolymer.
11. A process as in claim 2 wherein the concentrated aqueous latex additionally contains solution polymerized polybutadiene or solution polymerized styrene-butadiene random copolymer and a solution polymerized styrene-butadiene binary block copolymer.

* * * * *